Feb. 14, 1956 P. L. MUELLER 2,735,065
RESISTANCE MEASURING APPARATUS
Filed Sept. 30, 1952 4 Sheets-Sheet 3

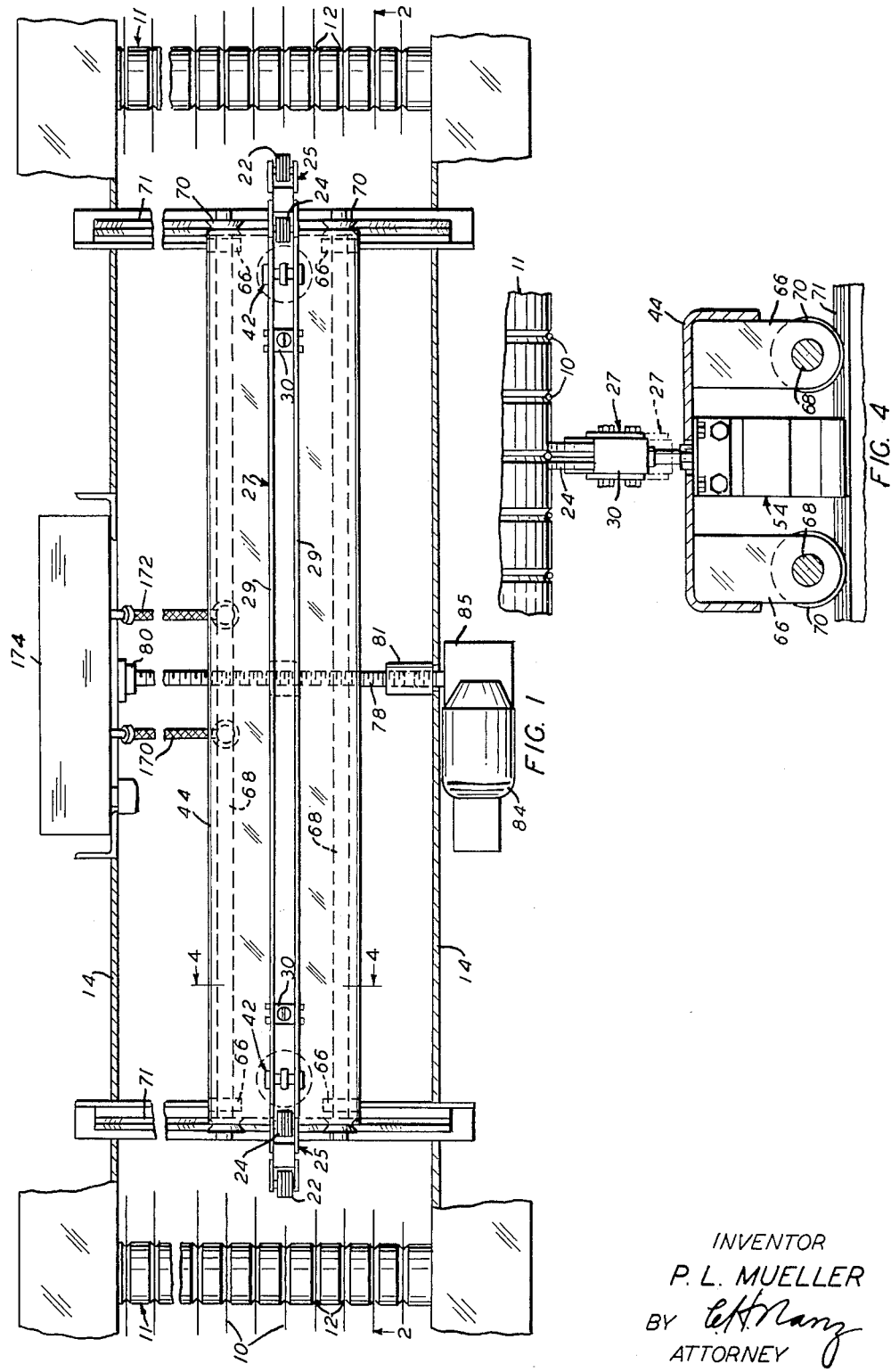

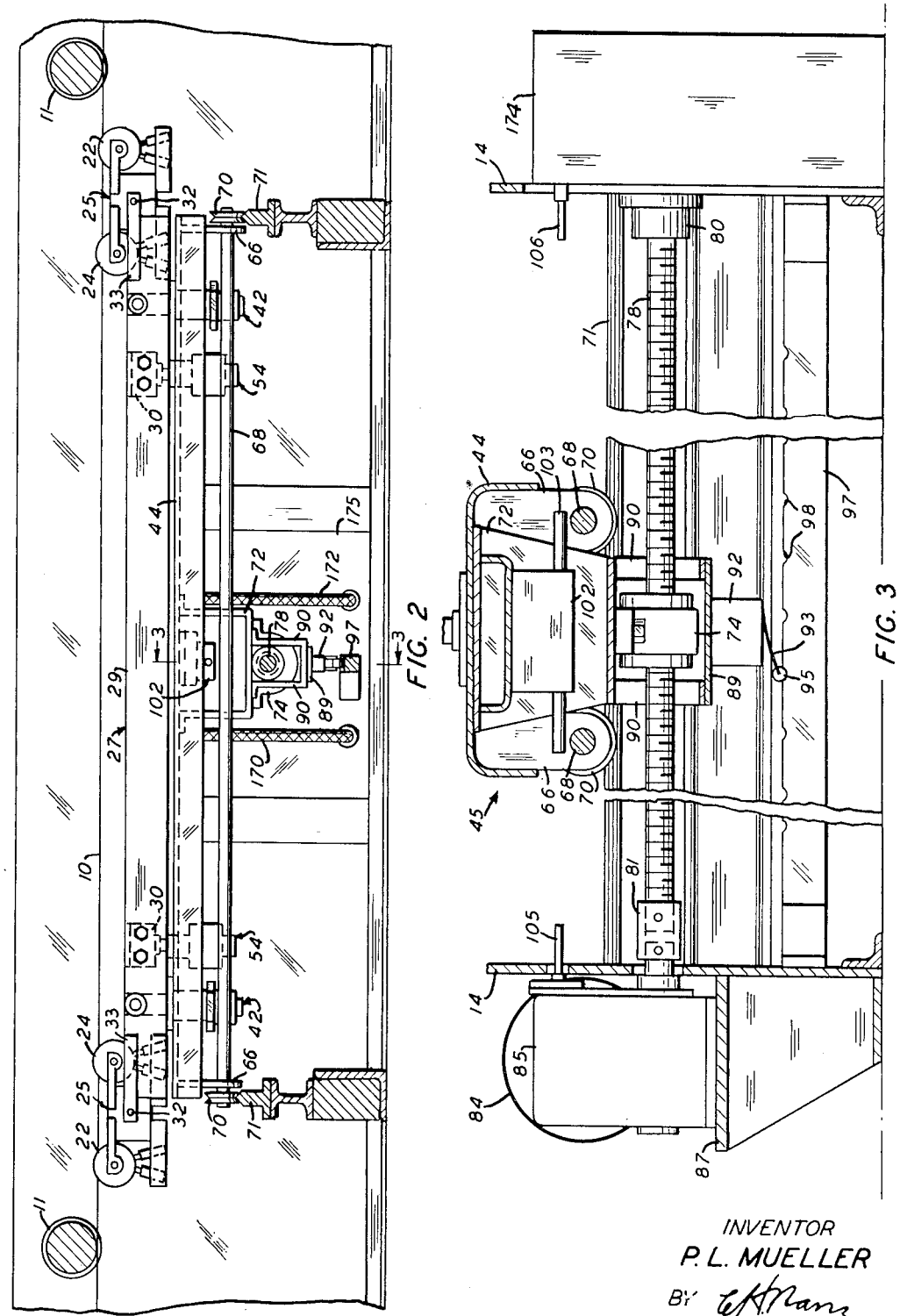

INVENTOR
P. L. MUELLER
BY
ATTORNEY

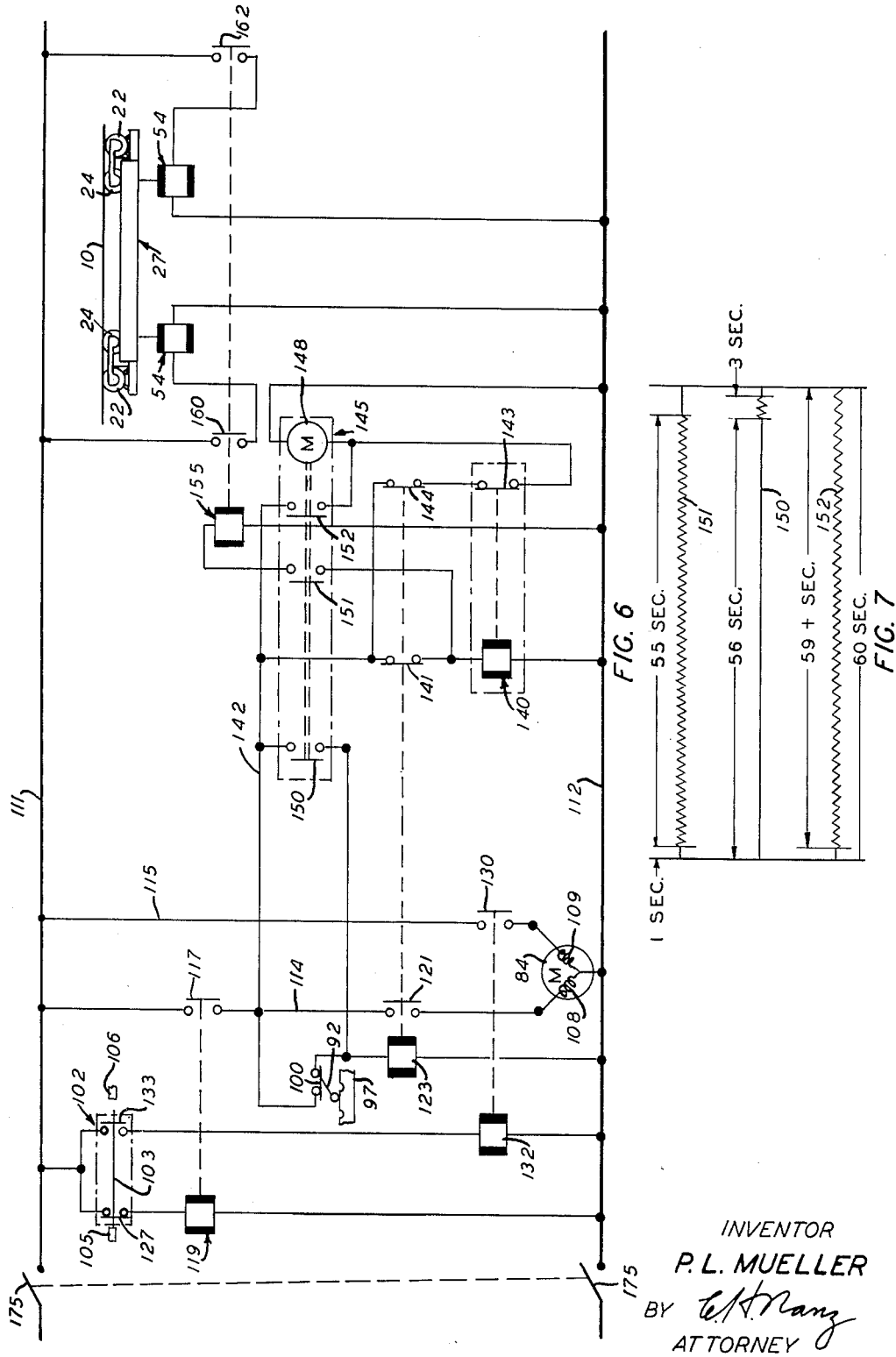

United States Patent Office 2,735,065
Patented Feb. 14, 1956

2,735,065

RESISTANCE MEASURING APPARATUS

Paul L. Mueller, Baltimore, Md., assignor to Western Electric Company, Incorporated, New York, N. Y., a corporation of New York Application September 30, 1952, Serial No. 312,209

5 Claims. (Cl. 324—62)

This invention relates to resistance measuring apparatus, and more particularly to apparatus for measuring the resistance of continuously advancing conductors.

In the manufacture of copper-covered steel conductors, it has been found desirable to advance a plurality of steel wires simultaneously and continuously through electroplating apparatus, including a series of cells containing electroplating solutions. As the steel wires progress through the electroplating apparatus, a uniform, heavy coating of copper is deposited thereupon to form copper-coated steel conductors for use in the telecommunications industry. Since it is essential that the resistance per unit length of the conductors be maintained within predetermined critical limits, it is necessary to provide control apparatus for automatically controlling the rate of plating in accordance with variations in the resistance of the finished conductors relative to a predetermined resistance standard. Control apparatus of this type is described in copending application Serial No. 312,326, filed September 30, 1952, by R. J. Bachman, C. E. Lewis, P. L. Mueller and G. E. Murray.

To insure the proper functioning of such control apparatus, it is expedient to provide additional apparatus for periodically measuring the resistance per unit length of each of the conductors as they continuously advance from the electroplating apparatus. Manifestly, no interruptions may be permitted in the progress of the continuously advancing conductors without causing damage thereto. Hence, the resistance measuring apparatus must be designed to obtain "on the fly" resistance measurements of each of the continuously advancing conductors, which may number as many as twenty-five in a typical commercial electroplating process.

An object of this invention is to provide new and improved resistance measuring apparatus.

Another object of this invention is to provide new and improved apparatus for measuring the resistance of continuously advancing conductors.

Other objects of this invention will become apparent as the specification proceeds.

An apparatus embodying certain features of this invention may include a movable support having a plurality of contacts spacedly mounted thereon and aligned along an axis parallel to an advancing conductor. Means are provided for selectively positioning the support adjacent to the conductor with the contacts in alignment therewith. Additional means are provided for moving the support so as to force the contacts into pressing engagement with the advancing conductor to establish electrical contacts therewith.

A complete understanding of the invention may be had from the following detailed description of a specific embodiment thereof, when read in conjunction with the appended drawings, in which:

Fig. 1 is a top plan view of an apparatus embodying the invention;

Fig. 2 is a vertical section taken along line 2—2 of Fig. 1;

Fig. 3 is an enlarged, fragmentary, vertical section taken along line 3—3 of Fig. 2;

Fig. 4 is an enlarged, fragmentary, vertical section taken along line 4—4 of Fig. 1;

Fig. 6 is a schematic diagram of an electrical circuit for controlling the apparatus, and Fig. 7 is a schematic diagram illustrating the operating sequence of a timer forming a part of the apparatus.

Figure 5:
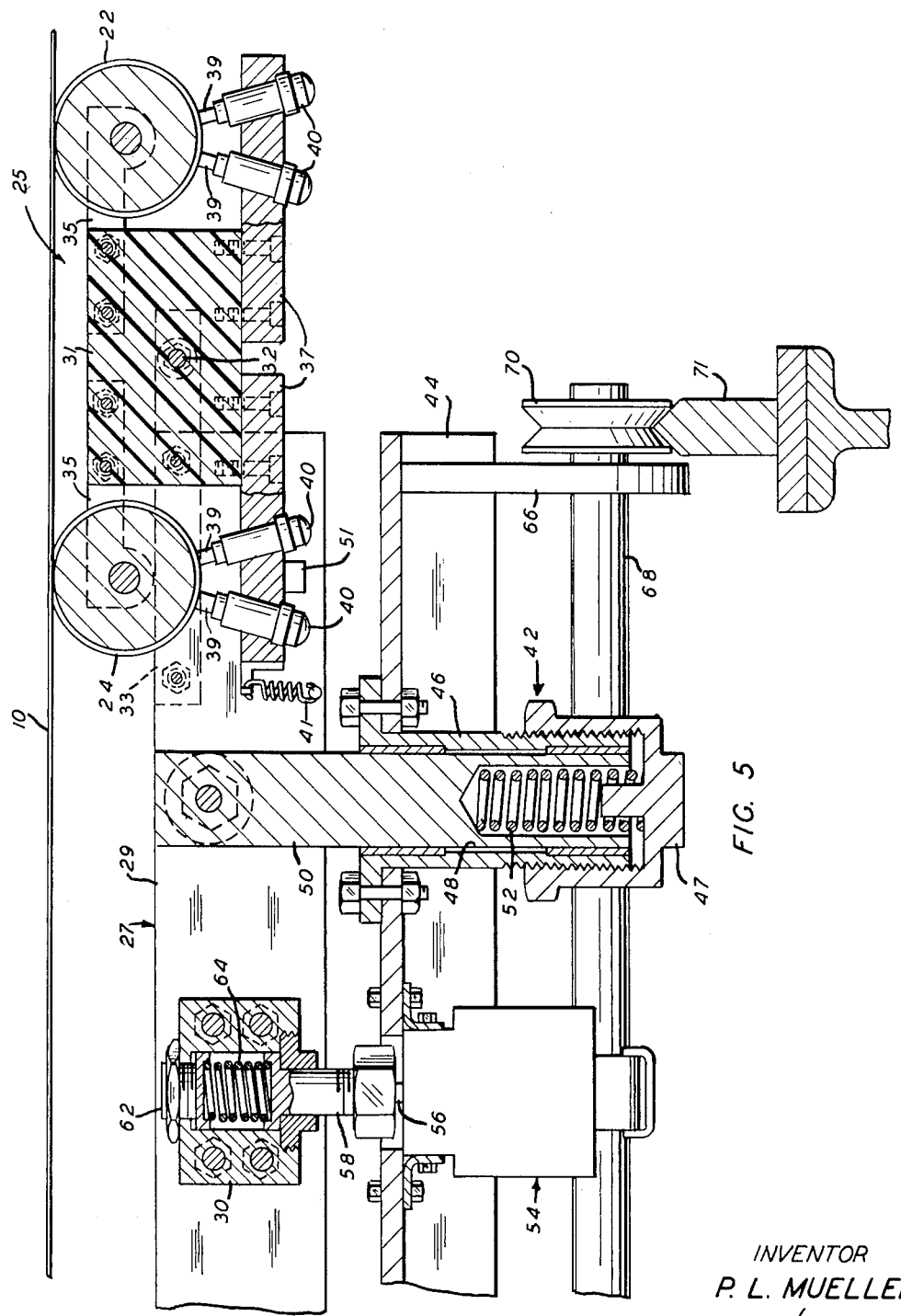
Fig. 5 is an enlarged fragmentary view, partly in section, of a portion of the apparatus.

Referring now to Fig. 1 of the drawings, an apparatus is shown for contacting successively each of a plurality of conductors 10—10 advancing continuously through an electroplating apparatus. The conductors 10—10 are advanced simultaneously at a constant speed by a suitable drive mechanism, including a series of rotatable drive rolls, two of which are shown at 11—11, transversely disposed between the longitudinal sides 14—14 of the electroplating apparatus and operatively connected to a suitable drive means (not shown). Each of the rolls 11—11 is provided with a plurality of equispaced U-shaped grooves 12—12 designed to receive the individual conductors 10—10 and maintain a predetermined spaced, parallel relationship therebetween. The rolls 11—11 are constructed of alternate annular segments of conductive and nonconductive materials. This particular design of the rolls 11—11 permits the portions of the conductors 10—10 to the right of the right-hand roll 11, as viewed in Fig. 1, to be electrically insulated from each other, since the design of the takeup apparatus (not shown) associated with the electroplating machine, is such that the conductors are electrically isolated with respect to each other.

As might be expected, the resistance per unit length of the conductors 10—10 is relatively low, in the order of approximately .020 ohm per linear foot at 68° F. Hence, it has been found desirable to use a well-known Kelvin bridge arrangement for accurately measuring the value of resistance of a predetermined length of the conductors 10—10. One of the features of a Kelvin bridge is the provision of separate current and potential contacts for connecting the unknown resistance, which in this case is a predetermined length of one of the conductors 10—10, and a standard resistance to the bridge circuit. The necessary current and potential contacts for electrically connecting the predetermined length of a conductor 10 to the bridge circuit are facilitated by grooved current contact rollers 22—22 and grooved potential contact rollers 24—24, respectively, one of each being mounted rotatably in tandem on contact roller assemblies 25—25 positioned at opposite ends of a longitudinally disposed horizontal support bracket 27. The bracket 27 is composed of a pair of parallel bars 29—29 secured to and spaced apart by spacer blocks 30—30.

Each of the contact roller assemblies 25—25, as shown in detail in Fig. 5, includes a rectangular phenol insulating block 31 pivotally mounted on a pin 32 secured between a pair of spaced pivot supports 33—33. The pivot supports 33—33 are fixedly secured to the one end of the bracket 27, one support being secured to each of the bars 29—29. Two pairs of spaced hangers 35—35 are fastened to either side of the upper portion of the insulating block 31 at either end thereof and project therefrom to rotatably support, in tandem, one of the current contact rollers 22—22 and one of the potential contact rollers 24—24, respectively.

Secured by threaded fasteners to the lower edge of the insulating block 31 and likewise projecting therefrom at either end are brush arms 37—37, each of which support two pairs of contact brushes 39—39 mounted in standard brush holders 40—40. The brush holders 40—40 are received within complementary bores formed in the brush arms 37—37, which align the brushes radially with respect to the axes of rotation of the rollers 22—22 and 24—24, thereby facilitating the tangential contact of the brushes with the periphery of the rollers. The phenol insulating block 31 provides the necessary electrical isolation between the contact rollers 22—22 and 24—24, respectively. The current contact rollers 22—22 and 24—24 are made of steel, copper, brass or the like.

Associated with each of the roller assemblies 25—25, is a tension spring 41 secured at one end to the bars 29—29 of the bracket 27 and at the other end to the innermost of the brush arms 37—37, in such a manner as to cause an unbalanced counterclockwise moment, as viewed in Fig. 5, of the roller assembly about the pin 32. The spring 41 normally urges the roller assembly into a position wherein the innermost of the brush arms 37—37 is held against a stop 51 (see Fig. 5) mounted near the end of the bracket 27. Thus, the stop 51 serves to restrict the counterclockwise rotation of the roller assembly past a horizontal position.

The ability of the roller assemblies 25—25 to rotate about the pins 32—32, facilitates the making of good electrical contacts between an advancing conductor and the contact rollers 22—22 and 24—24, respectively. This is a very important consideration, since the resistances being measured are of a relatively low value. Since the conductors 10—10 possess a certain amount of flexibility, some degree of deflection occurs when a force is exerted thereupon and the conductor assumes a slightly arcuate path. Hence, if the roller assemblies 25—25 were not permitted to rotate a small amount, it is possible that contact might be established between only one of the contact rollers and the conductor.

The bracket 27, supporting the roller assemblies 25—25 at opposite ends, is resiliently mounted on a pair of shock absorbers 42—42, which are positioned at opposite ends of a channel member 44 forming a part of a movable carriage, shown generally at 45, and serve to guide and support the bracket. One of the shock absorbers 42—42 is shown in detail in Fig. 5, from which it is apparent that each of the shock absorbers includes a flanged housing 46 having its lower end threaded for receiving a complementary internally-threaded retainer cap 47. Slidably mounted in a bore 48 formed in the housing 46 is a stem 50 having its lower end counterbored to receive a compression spring 52 positioned within and against the cap 47. The upper end of the resiliently and slidably mounted stem 50 is secured between the bars 29—29 of the bracket 27. The housing 46 is received within a complementary aperture formed in the channel member 44 with the flanged portion thereof secured by threaded fasteners to the upper surface of the channel member.

Spacedly mounted on the channel member 44, between the shock absorbers 42—42, are a pair of push-type solenoids 54—54 having movable plungers 56—56 associated therewith. When the operating coils of the solenoids 54—54 are energized, the plungers 56—56 move upwardly a predetermined distance with a predetermined force.

The plungers 56—56 are designed to contact spring-pressed abutments 58—58 slidably mounted and retained within corresponding bores in spring housings formed in the spacer blocks 30—30, one of which is shown in detail in Fig. 5. Adjustment screws, one of which designated 62 is shown in Fig. 5, are provided for adjusting the force exerted by compression springs, one of which designated 64 is shown in Fig. 5, interposed between the adjustment screw 62 and the abutment 58.

Secured to and depending from the corners of the channel member 44 are mounting brackets 66—66, which rotatably support a pair of axles 68—68 longitudinally disposed therebetween. The ends of the axles 68—68 extend a short distance beyond the mounting brackets to receive two pairs of grooved wheels 70—70 fixedly secured to the axles for rotation therewith. The grooved wheels 70—70 are designed to roll along a pair of spaced, transversely disposed rails 71—71 mounted between the longitudinal sides 14—14 of electroplating apparatus, so as to facilitate transverse movements of the carriage 45, with the bracket 27 mounted thereupon, beneath the advancing conductors 10—10.

Pendantly mounted from the undersurface of the channel member 44, at a point intermediate the ends thereof, is a U-shaped support frame 72. The support frame 72 has a pillow block 74 fixedly secured to its undersurface in a position wherein the longitudinal axis of a bore formed therein is aligned transversely with respect to the longitudinal axis of the carriage 45. A screw bushing is fixedly mounted within the bore of the pillow block 74 and is designed to threadedly receive and engage a transversely positioned lead screw 78. The lead screw 78 is rotatably journaled at one end in a journal bearing 80 secured to one of the sides 14—14 of the electroplating apparatus and the other end of the lead screw is operatively connected by a drive coupling 81 to an electric motor 84 through a gear reduction box 85. The motor 84 and gear reduction box 85 are mounted on a platform 87 at the other side of the electroplating apparatus. It is readily apparent that rotation of the lead screw 78 by means of the motor 84 will cause transverse movement of the carriage 45.

A mounting plate 89, attached to the undersurface of the support frame 72 by four mounting legs 90—90, provides a support for a microswitch 92 depending therefrom. The microswitch 92 is provided with an actuator 93 having a roller 95 rotatably mounted at one end. The roller 95 is designed to roll along the top edge of a transversely disposed cam bar 97 provided with a plurality of notches 98—98 spaced therealong at predetermined intervals. The cam bar 97 is fixedly secured at opposite ends to the sides 14—14 of the electroplating apparatus.

As the carriage 45 moves in either direction on the rails (right or left as viewed in Fig. 3) the roller 95 rides along the notched edge of the cam bar, dropping sequentially into the notches 98—98. The number and spacing of the notches 98—98 are determined by the number and spacing of the conductors 10—10 which advance overhead. The notches are placed so that when the roller 95 of the microswitch 92 is engaged in a notch the carrier 45 is in a position such that the contact rollers 22—22 and 24—24 mounted on the bracket are accurately positioned beneath one of the conductors. Whenever the roller 95 drops into one of the notches 98—98, a contact 100 in the microswitch (see Fig. 6) is opened. The effect of the opening of the contact 100 will be hereinafter described in detail in conjunction with Fig. 6.

Fixedly mounted beneath the channel member 44 is a reversing switch 102 having a rod-like actuator 103 extending from the right and left sides thereof (as viewed in Fig. 3). The actuator 103 is operated alternately by lugs 105 and 106 mounted on opposite sides of the electroplating apparatus and aligned with the longitudinal axis of the actuator.

Referring again to the schematic electrical diagram shown in Fig. 6, the forward and reverse coils 108 and 109, respectively, of the motor 84 are connected across the power supply lines 111 and 112 by means of lines 114 and 115, respectively. The forward coil 108 is connected in series with a normally open contact 117 of a solenoid operated relay 119 and a normally open contact 121 of a solenoid operated relay 123. The relay 119 has its solenoid operating coil connected in series with a contact 127 of the power supply lines 111 and 112. The solenoid operating coil of the relay 123 has one side connected to the power supply line 112 and its other side connected in series with the contact 100 of the microswitch 92 to the line 114 at a point intermediate of the contacts 117 and 121, so as to effectively shunt the contact 121 when the microswitch contact 100 is closed.

The reverse coil 109 of the motor 84 is connected in series with a normally open contact 130 of a solenoid operated relay 132. The solenoid operating coil of the relay 132 is connected across the power supply lines through a contact 133 of the reversing switch 102. The contacts 127 and 133 are operatively connected to the actuator 103, which is operated alternately by lugs 105 and 106. When the actuator 103 is carried against the lug 105 by the carriage 45 moving in the reverse direction (from right to left as viewed in Fig. 3), the actuator 103 is forced to the right closing the contact 127 of switch 102 and opening contact 133.

A time delay relay 140 has its operating coil connected on one side to the power supply line 112 and its other side connected in series with a normally-closed contact 141 of the solenoid operated relay 123 to a bus line 142, which in turn is connected to line 114 at a point between contacts 117 and 121. The time delay relay 140, when energized, opens its associated contact 143 after a five second delay. Connected between the line 142 and the power supply line 112, in series with the normally closed contact 143 of the time delay relay 140 and a normally closed contact 144 of the solenoid relay 123, is a cam timer 145. The cam timer 145 is a conventional, commercially available unit powered with a synchronous, unidirectional motor, shown schematically at 148, which drives a cam shaft (not shown) at a predetermined rate to sequentially operate a series of contacts 150, 151 and 152 by means of cams (not shown) mounted on the cam shaft. The operation sequence of cam operated contacts 150, 151 and 152 is illustrated in Fig. 7.

Contact 150 is normally open, and when it is closed it shunts the microswitch contact 100. Contact 151 is normally open and when it is closed connects the operating coil of a solenoid operated relay 155 across power supply line 112 and the line 142 through the normally closed contact 141 of relay 123. The contact 152 when closed effectively shunts the series contact arrangement of contact 143 of the relay 140 and contact 144 of the solenoid 123. The relay 155 operates two normally open contacts 160 and 162, which when closed connect the operating coils of solenoids 54—54, respectively, across the power supply lines 111 and 112.

A pair of flexible, expansible electrical leads 170 and 172 (Fig. 1) are provided for making the necessary electrical connections between the contact rollers 22—22 and 24—24 and the other components of the Kelvin bridge circuit, a portion of which is contained in a housing 174 secured to one side of the electroplating apparatus.

Operation

To illustrate the operation of the resistance measuring device, let us assume that the electroplating apparatus is in operation and the conductors 10—10 are continuously advancing in contact with the drive rolls 11—11. Further, for the sake of simplicity, we shall assume that the power supply lines 111 and 112 are energized through double pole switches 175—175 and that the carriage 45 is in its extreme left-hand position (as viewed in Fig. 3) with the actuator 103 against the projecting lug 105 which has just operated the contact 127 to its closed position and opened the contact 133. In this position, the solenoids 54—54 are de-energized and the bracket 27 rests upon the shock absorbers 42—42 below the horizontal plane of the conductors 10—10.

With the contact 127 closed and the contact 133 open (Fig. 6), the relay 119 is energized to close its associated contact 117, thereby energizing the operating coil of relay 123 through the normally closed contact 100 of the microswitch 92, to close its associated contact 121 and open the contacts 141 and 144.

When the contact 117 closes, the bus line 142 is energized. Since the contact 100 is closed and the relay 123 is energized, the contact 144 is open. Hence, the motor 148 of the cam timer 145 is de-energized and, as will be hereinafter explained, is ready upon subsequent energization to perform a new and complete cycle of operation. It will be noted that once the timer motor 148 is energized for more than 1% of its 60 second cycle, the contact 152 closes and remains closed for the remainder of the cycle, whereupon it opens. Hence, the timer motor 148 is locked into the circuit and self-sustained through its own contact 152 for the duration of the cycle of the cam shaft.

Since the contacts 117 and 121 have been closed, the coil 108 is energized to cause the motor 84 to rotate the lead screw 78, through the gear reduction box 85, so as to cause the carriage 45 to travel forward (from left to right as viewed in Fig. 3). The roller 95 of the microswitch 92 rides along the notched edge of the cam bar 97 until it drops into the first notch of the sequence of notches 98—98, which is aligned beneath the first conductor, counting from left to right as viewed in Fig. 3, of the conductors 10—10.

When the roller 95 drops into the first notch, the contact 100 is opened, thereby de-energizing the relay 123 and causing the contact 121 to open and the contacts 141 and 144 to close simultaneously. The opening of the contact 121 causes the coil 108 to be de-energized, thereby stopping the motor 84 which in turn halts the movement of the carriage 45 with the contact rollers 22—22 and 24—24 positioned beneath and in alignment with the first conductor of the conductors 10—10.

The closing of the contacts 141 and 144 energizes the time delay relay 140 and completes the bridge path composed of the contacts 143 and 144, thereby energizing the timer motor 148 to initiate a cycle of the cam shaft which operates the contacts 150, 151 and 152, in the sequence illustrated in Fig. 7. The contact 152 (see Fig. 7) closes immediately and when the contact 143 opens after a five second delay, the operation of the motor 148 is sustained for the remainder of the cycle by the closed contact 152 for the remainder of the cycle, whereupon it opens to stop the motor 148.

The contact 151 closes one second after the start of the cycle and remains closed for 55 seconds thereof. The closing of contact 151 energizes the relay 155 through the closed contact 141, thereby closing contacts 160 and 162. When the contacts 161 and 162 are closed, the solenoids 54—54 are connected across the power supply lines 111 and 112, and are energized to cause their plungers 56—56 to move upwardly to carry the bracket 27 therewith and place the contact rollers 22—22 and 24—24 in pressing electrical contact with the first conductor of the series of advancing conductors 10—10.

Since the contact 151 remains closed for 55 seconds of the 60 second cycle (see Fig. 8), sufficient time is allowed for the Kelvin bridge to be balanced by a well-known automatic balancing means (not shown) and for a reading of the resistance of a predetermined length of the conductor to be recorded by a well-known recording means (not shown).

The contact 151 opens after the 55 seconds have elapsed and simultaneously with its opening the contact 150 closes for 3 seconds to re-energize the operating coil of the relay 123, thereby closing the contact 121 and opening the contacts 141 and 144. The closing of the contact 121 re-energizes the coil 108 to restart the motor 84 to move the carrier ahead to a position wherein the roller 95 no longer rests in the first notch and its associated contact 100 is closed. After the 3 seconds have elapsed, the contact 150 reopens, but the motor 84 continues driving the lead screw 78 to advance the carriage 45 to the next notch of the sequence of notches 98—98, since the relay 123 remains energized by means of the now closed contact 100, the timer motor 148 meantime running to its start position where 152 opens and stops the motor 148.

When the roller 95 drops in the second notch, the previously described sequence of operations is repeated and so on until the carriage 45 carries the actuator 103 into abutting contact with the lug 106, whereupon the actuator 103 is moved to close contact 133 and open the contact 127. With the contact 133 closed, the relay 132 is energized to close a contact 130, thereupon energizing the coil 109 to drive the motor 84 in a reverse direction. With the motor 84 running in a reverse direction, the lead screw 57 is rotated in such a manner as to cause the carriage 45 to move from right to left as viewed in Fig. 3, whereupon the carriage 45 transported back to the extreme left side of the electroplating apparatus and the actuator 103 strikes the stop 105 to open the contact 133 and close the contact 127.

During the movement of the carriage 45 in the reverse direction, the timer motor 148 is de-energized due to the open contact 117. With the reclosing of contact 127, the carriage 45 repeats its forward traverse and is again indexed successively into position beneath each of the conductors 10—10, wherein a predetermined length of each of the advancing conductors are contacted and its resistance recorded.

It will be understood that the heretofore described apparatus merely represents a preferred embodiment of the invention and that various modifications of the apparatus may be made within the spirit and scope thereof.

It will be further understood that the use of the heretofore described resistance measuring apparatus is not intended to be limited to measuring the resistance of copper-covered steel conductors. Manifestly, the apparatus may be used for making electrical connections with various types of continuously advancing conductors.

What is claimed is:

1. Apparatus for measuring the individual resistances of a plurality of continuously advancing, horizontally disposed, parallelly spaced conductors, which comprises a movable carriage, a support mounted for vertical movement on said carriage, a plurality of contact rollers mounted rotatably in tandem on the support along an axis parallel to the advancing conductors, a rotatably mounted lead screw operatively connected to the carriage for movement thereof transversely with respect to the conductors, an electric motor operatively connected to the lead screw and energizable to rotate said lead screw to move the carriage at a predetermined speed, a switch, an electric control circuit associated with the switch for controlling the energization of the electric motor, cam means for operating the switch to cause the carriage to be moved successively into positions beneath each of the advancing conductors wherein the carriage remains for a predetermined period of time, and means automatically energized for a portion of said predetermined period of time when the carriage is in a position beneath one of the conductors to elevate the support and force the contact rollers into pressing electrical contact with said conductor.

2. Apparatus for measuring the individual resistances of a plurality of continuously advancing, coplanarly disposed, parallelly spaced conductors, which comprises a movable carriage, a pair of solenoid actuated plungers mounted on the carriage, a support mounted on the plungers for vertical movement therewith, a plurality of contact rollers mounted rotatably in tandem on the support along an axis parallel to the advancing conductors, a rotatably mounted lead screw operatively connected to the carriage for movement thereof transversely with respect to the conductors, an electric motor operatively connected to the lead screw and energizable to rotate said lead screw to move the carriage at a predetermined speed, a switch, an electric control circuit associated with the switch for controlling the energization of the electric motor, means for operating the switch to cause the carriage to be moved successively into positions beneath each of the advancing conductors wherein the carriage remains for a predetermined period of time, and means for energizing the solenoids associated with the plungers for a portion of said predetermined period of time when the carriage is in a position beneath one of the conductors to actuate said plungers so as to elevate the support and force the contact rollers into pressing electrical contact with the particular conductor.

3. Apparatus for measuring the individual resistances of a plurality of continuously advancing, horizontally disposed, parallelly spaced conductors, which comprises a movable carriage, a track transversely disposed with respect to the advance of the conductors for guiding the carriage for movement beneath said conductors, a pair of solenoid actuated plungers mounted at either end of the carriage, a support mounted on the plungers for vertical movement therewith, the longitudinal axis of said support being parallelly disposed with respect to the advancing conductors, a grooved current contact roller rotatably mounted at either end of the support, a pair of grooved potential contact rollers rotatably mounted on the support between the current contact rollers and spaced apart a predetermined distance, said current and potential contact rollers being electrically insulated from each other and aligned in tandem along the longitudinal axis of support, a rotatably mounted lead screw operatively connected to the carriage for movement thereof along the track, an electric motor operatively connected to the lead screw and energizable to rotate said lead screw to move the carriage at a predetermined speed, a switch, an electric control circuit associated with the switch for controlling the energization of the electric motor, cam means for operating the switch to cause the carriage to be moved successively into positions beneath each of the advancing conductors wherein the carriage remains for a predetermined period of time, and means for energizing the solenoids associated with the plungers for a portion of said predetermined period of time when the carriage is in a position beneath one of the conductors to actuate said plungers so as to elevate the support and force the contact rollers into pressing electrical contact with said conductor.

4. Apparatus for measuring the individual resistances of a plurality of continuously advancing, parallel, horizontally disposed, laterally spaced conductors, which comprises a laterally movable carriage, a support mounted on the carriage for lateral movement therewith and vertical movement independent of said carriage, a pair of spaced electrical contacts mounted in tandem on the support along an axis parallel to the conductors, electric drive means operable for moving the carriage laterally with respect to the conductors along a predetermined path of travel adjacent thereto, an electrical circuit for operating the drive means, switching means associated with said circuit and actuatable for deenergizing the drive means, means for actuating said switching means to deenergize the drive means whenever the carriage is positioned immediately adjacent to one of the conductors and the contacts thereon are aligned vertically with the conductor, timing means energized by said switching means each time the latter is actuated to deenergize the drive means for reenergizing the drive means after a predetermined time delay, said drive means remaining energized until the switching means is again actuated whereby the carriage moves successively into positions immediately adjacent to each of the conductors and remains stationary in each of such positions for the predetermined time delay, and means operated during the predetermined time delay for moving the support vertically to press the contacts into engagement with the moving conductor so as to establish electrical connections therewith and for subsequently returning the support to its retracted position before the end of said time delay.

5. Apparatus for measuring the individual resistances of a plurality of continuously advancing, parallel, horizontally disposed, laterally spaced conductors, which comprises a laterally movable carriage, a support mounted on the carriage for lateral movement therewith and vertical movement independent of said carriage, a pair of spaced electrical contacts mounted in tandem on the support along an axis parallel to the conductors, electric drive means operable for moving the carriage laterally with respect to the conductors along a predetermined path of travel adjacent thereof, an electrical circuit for operating the drive means, a switch associated with said circuit and actuatable for deenergizing the drive means, cam means positioned adjacent to the path of travel of the carriage for actuating said switch to deenergize the drive means whenever the carriage is positioned immediately adjacent to one of the conductors and the contacts thereon are aligned vertically with the conductor, a timer energized when the switch is actuated to deenergize the drive means for reenergizing the drive means for reenergizing the drive means after a predetermined time delay, said drive means remaining energized until the switch is again actuated whereby the carriage moves successively into positions immediately adjacent to each of the conductors and remains stationary in each of such positions for the predetermined time delay, and means operated during the predetermined time delay for moving the support vertically to press the contacts into engagement with the moving conductor so as to establish electrical connections therewith and for subsequently returning the support to its retracted position before the end of said time delay.

References Cited in the file of this patent

UNITED STATES PATENTS

| | | |
|---|---|---|
| 520,156 | Brown | May 22, 1894 |
| 2,607,856 | Sengebusch | Aug. 19, 1952 |